United States Patent
Chen

(10) Patent No.: US 11,869,524 B2
(45) Date of Patent: Jan. 9, 2024

(54) AUDIO PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventor: Fasheng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 219 days.

(21) Appl. No.: 17/537,170

(22) Filed: Nov. 29, 2021

(65) Prior Publication Data

US 2022/0084532 A1    Mar. 17, 2022

Related U.S. Application Data

(63) Continuation of application No. PCT/CN2020/117317, filed on Sep. 24, 2020.

(30) Foreign Application Priority Data

Oct. 30, 2019    (CN) .......................... 201911059849.5

(51) Int. Cl.
  *H04R 29/00*    (2006.01)
  *G10L 19/24*    (2013.01)
  *G06N 3/08*    (2023.01)

(52) U.S. Cl.
  CPC ............... *G10L 19/24* (2013.01); *G06N 3/08* (2013.01)

(58) Field of Classification Search
  CPC .................................. G10L 19/24; G06N 3/08
  See application file for complete search history.

(56) References Cited

U.S. PATENT DOCUMENTS

| 2014/0363093 | A1* | 12/2014 | Miller | H04N 19/40 |
| | | | | 382/235 |
| 2018/0240437 | A1* | 8/2018 | Miller | H04N 19/40 |
| 2019/0339688 | A1* | 11/2019 | Cella | H04L 1/18 |
| 2020/0310758 | A1* | 10/2020 | Desoli | G06N 3/063 |

FOREIGN PATENT DOCUMENTS

| CN | 101086845 A | 12/2007 |
| CN | 101217038 A | 7/2008 |
| CN | 102610267 | 7/2012 |

(Continued)

OTHER PUBLICATIONS

International Search Report and Written Opinion for PCT/CN2020/117317 dated Dec. 1, 2020 including translation of the International Search Report (14 pages).

(Continued)

*Primary Examiner* — Simon King
(74) *Attorney, Agent, or Firm* — Crowell & Moring LLP

(57) ABSTRACT

This application relates to an audio processing method and apparatus, a computer device, and a storage medium, and relates to the field of audio processing technologies. The method is executed by a computer device and includes: acquiring first audio data of which a sampling rate is a first sampling rate, processing the first audio data by using a super-resolution model, and obtaining second audio data according to an output result of the super-resolution model, a sampling rate of the second audio data being a second sampling rate, the second sampling rate being N times the first sampling rate.

20 Claims, 8 Drawing Sheets

(56) References Cited

FOREIGN PATENT DOCUMENTS

| | | |
|---|---|---|
| CN | 103366749 A | 10/2013 |
| CN | 103514883 A | 1/2014 |
| CN | 103606373 A | 2/2014 |
| CN | 109036457 A | 12/2018 |
| CN | 109074813 A | 12/2018 |
| CN | 109147804 A | 1/2019 |
| CN | 109147805 A | 1/2019 |
| CN | 110797038 A | 2/2020 |
| WO | WO2015/079946 A1 | 6/2015 |
| WO | WO 2019/004592 A1 | 1/2019 |
| WO | WO 2019/063547 A1 | 4/2019 |
| WO | WO 2019/197710 A1 | 10/2019 |

OTHER PUBLICATIONS

Chinese Office Action for Chinese Patent Application 2019110598495 dated Aug. 15, 2020, including an English Concise Explanation (9 pages).

Extended European Search Report for Application No. 20881243.8 dated Oct. 12, 2022 (10 pages).

Yu Gu, et al. "*Waveform Modeling Using Stacked Dilated Convolutional Neural Networks for Speech Bandwidth Extension*", Interspeech 2017, Jan. 1, 2017, pp. 1123-1127 (5 pages).

Fei Gao, et al. "*Efficient Sequence Learning with Group Recurrent Networks*", Jun. 6, 2018, pp. 799-808; (10 pages).

Xiangyu Zhang, et al. "ShuffleNet: *An Extremely Efficient Convolutional Neural Network for Mobile Devices*", Jul. 4, 2017 (10 pages).

\* cited by examiner

AUDIO PROCESSING METHOD AND APPARATUS, COMPUTER DEVICE, AND STORAGE MEDIUM

RELATED APPLICATION

This application is a continuation of International Patent Application No. PCT/CN2020/117317, filed Sep. 24, 2020, which claims priority to Chinese Patent Application No. 201911059849.5, entitled "AUDIO PROCESSING METHOD AND APPARATUS, COMPUTER DEVICE, AND STORAGE MEDIUM" filed with the China National Intellectual Property Administration on Oct. 30, 2019. The contents of International Patent Application No. PCT/CN2020/117317 and Chinese Patent Application No. 201911059849.5 are incorporated by reference in their entirety.

FIELD OF THE TECHNOLOGY

Embodiments of this application relate to the field of audio processing technologies, and in particular, to an audio processing method and apparatus, a computer device, and a storage medium.

BACKGROUND OF THE DISCLOSURE

With the continuous development of digital music technologies, users have increasingly high requirements on sound quality of audio or videos, which requires audio playback products (devices or application programs) to provide audio data with a higher sampling rate.

In the related art, devices or application programs supporting music playback can perform super-resolution processing on audio data with a low sampling rate by using a preset audio data algorithm, to obtain audio data with high resolution. For example, the audio data with a low sampling rate may be upsampled by using an audio data upsampling algorithm based on one-dimensional interpolation or by using an audio data upsampling algorithm based on a Fourier transform.

Compared with raw audio, audio data with a low sampling rate usually lacks many high-frequency components, and the foregoing missing high-frequency components cannot be compensated for by using audio data upsampling algorithms in the related art, resulting in poor audio processing results.

SUMMARY

Embodiments of this application provide an audio processing method and apparatus, a computer device, and a storage medium, to improve a super-resolution processing result of audio data. Technical solution are as follows:

According to an aspect, an audio processing method is provided, performed by a computer device, the method including:

acquiring first audio data, a sampling rate of the first audio data being a first sampling rate;

processing the first audio data by using a super-resolution model, to obtain an output result of the super-resolution model, the super-resolution model being a machine learning (ML) model obtained by performing deep learning (DL) training using a first audio sample as input data and a second audio sample as target data, the first audio sample being obtained by performing N times downsampling on the second audio sample, N being an integer greater than or equal to 2; and obtaining second audio data according to the output result of the super-resolution model, a sampling rate of the second audio data being a second sampling rate, the second sampling rate being N times the first sampling rate.

According to another aspect, an audio processing apparatus is provided, including:

an audio data acquiring module, configured to acquire first audio data, a sampling rate of the first audio data being a first sampling rate;

a super-resolution processing module, configured to process the first audio data by using a super-resolution model, to obtain an output result of the super-resolution model, the super-resolution model being an ML model obtained by performing DL training using a first audio sample as input data and a second audio sample as target data, the first audio sample being obtained by performing N times downsampling on the second audio sample, N being an integer greater than or equal to 2; and an audio data obtaining module, configured to obtain second audio data according to the output result of the super-resolution model, a sampling rate of the second audio data being a second sampling rate, the second sampling rate being N times the first sampling rate.

In some embodiments, the first audio data is audio data corresponding to R tracks, R being an integer greater than or equal to 1;

the super-resolution processing module includes:

a track division sub-module, configured to divide the first audio data into R pieces of first single-track audio data, a sampling rate of the first single-track audio data being the first sampling rate; and a model processing sub-module, configured to process the R pieces of first single-track audio data respectively by using the super-resolution model, to obtain pieces of second single-track audio data respectively corresponding to the R pieces of first single-track audio data, a sampling rate of the second single-track audio data being the second sampling rate; and the audio data obtaining module is configured to perform track synthesis on the pieces of second single-track audio data respectively corresponding to the R pieces of first single-track audio data, to obtain the second audio data.

In some embodiments, the super-resolution model includes an input layer, a feature extraction layer, an upsampling layer, and an output layer; and the model processing sub-module is configured to:

organize an audio data sequence with a length of M/N in target single-track audio data as an input data unit by using the input layer, a size of the input data unit being M/N×1×1, M/N being an integer greater than or equal to 2, and the target single-track audio data being any piece of single-track audio data in the R pieces of first single-track audio data;

perform feature extraction on the input data unit by using the feature extraction layer, to obtain a feature data unit with a size of M/N×1×S, S being a quantity of channels of the feature data unit, and S being an integer greater than or equal to 2;

perform N times upsampling on the feature data unit by using the upsampling layer, to obtain an upsampled data unit with a size of M×1×1; and output an audio data sequence with a length of M in second single-track audio data corresponding to the target single-track audio data by using the output layer according to the upsampled data unit.

In some embodiments, the upsampling layer includes a first convolutional layer and a data rearrangement layer.

When performing N times upsampling on the feature data unit by using the upsampling layer, to obtain an upsampled data unit with a size of M×1×1, the model processing sub-module is configured to:

convert the feature data unit into a to-be-sampled data unit through convolution processing performed by the first convolutional layer, a size of the to-be-sampled data unit being M/N×1×N; and exchange data in the first dimension and the second dimension of the to-be-sampled data unit by using the data rearrangement layer, and performing dimensional transformation on the to-be-sampled data unit after the data exchange, to obtain the upsampled data unit.

In some embodiments, the apparatus further includes:

a first model acquiring module, configured to acquire the super-resolution model corresponding to the first sampling rate and the second sampling rate before the super-resolution processing module processes the first audio data by using the super-resolution model, to obtain the output result of the super-resolution model, a sampling rate of the first audio sample being the first sampling rate, and a sampling rate of the second audio sample being the second sampling rate.

In some embodiments, the apparatus further includes:

a second model acquiring module, configured to acquire the super-resolution model corresponding to a super-resolution multiple before the super-resolution processing module processes the first audio data by using the super-resolution model, to obtain the output result of the super-resolution model, the super-resolution multiple being a multiple N of the second sampling rate relative to the first sampling rate, a multiple relationship between the first sampling rate and the second audio sampling rate being equal to a multiple relationship between a sampling rate of the first audio sample and a sampling rate of the second audio sample.

In some embodiments, the first audio sample and the second audio sample are respectively single-track audio data; and the apparatus further includes:

an input module, configured to input the first audio sample into the DL model, to obtain super-resolution audio data corresponding to the first audio sample before the super-resolution processing module processes the first audio data by using the super-resolution model, to obtain the output result of the super-resolution model, a sampling rate of the super-resolution audio data being N times that of the first audio sample, and a model structure of the DL model being the same as a model structure of the super-resolution model;

a loss calculation module, configured to calculate a loss function value according to the second audio sample and the super-resolution audio data;

an update module, configured to update a model parameter of the DL model according to the loss function value; and a third model acquiring module, configured to use the DL model as the super-resolution model when the DL model converges.

In some embodiments, the apparatus further includes:

a division module, configured to perform track division on a raw audio sample, to obtain raw single-track audio, before the input module inputs the first audio sample into the DL model, to obtain super-resolution audio data corresponding to the first audio sample;

a first downsampling module, configured to downsample the raw single-track audio, to obtain the second audio sample with a length of M, M being a unit length of an audio data sequence outputted by the super-resolution model, and M/N being an integer greater than or equal to 2; and a second downsampling module, configured to perform N times downsampling on the second audio sample, to obtain the first audio sample with a length of M/N.

In some embodiments, the second downsampling module is configured to:

perform N times downsampling on the second audio sample by using a specified downsampling algorithm, to obtain the first audio sample with a length of M/N, the specified downsampling algorithm including a downsampling algorithm based on mean filtering, a downsampling algorithm based on one-dimensional linear interpolation, or a downsampling algorithm based on Fourier interpolation.

In some embodiments, the update module is configured to:

update the model parameter of the DL model according to the loss function value by using a specified parameter optimization algorithm, the specified parameter optimization algorithm including a quasi-Newton algorithm or gradient descent algorithm.

In some embodiments, the loss calculation module is configured to calculate a least square error between the second audio sample and the super-resolution audio data, to obtain the loss function value.

According to still another aspect, a computer device is provided, including a processor and a memory, the memory storing at least one instruction, at least one program, a code set, or an instruction set, and the at least one instruction, the at least one program, the code set or the instruction set being loaded and executed by the processor to implement the audio processing method described above.

According to still another aspect, a computer-readable storage medium is provided, the storage medium storing at least one instruction, at least one program, a code set, or an instruction set, and the at least one instruction, the at least one program, the code set, or the instruction set being loaded and executed by a processor to perform the audio processing method described above.

According to still another aspect, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the audio processing method.

First audio data of which a sampling rate is a first sampling rate is acquired, the first audio data is processed by using the super-resolution model, and second audio data is obtained according to an output result of the super-resolution model, a sampling rate of the second audio data being a second sampling rate, the second sampling rate being N times the first sampling rate. Because the super-resolution model is an ML model obtained by performing DL training using a first audio sample as input data and a second audio sample as target data, and the first audio sample is obtained by performing N times downsampling on the second audio sample, the model can relatively accurately restore a high-frequency component that audio data with a low sampling rate lacks. That is, the solution of processing audio data with a low sampling rate by using the super-resolution model to obtain audio data with a high sampling rate can significantly improve an effect of audio processing.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into the specification and constitute a part of this specification, show embodiments that conform to this application, and are used for describing a principle of this application together with this specification.

DESCRIPTION OF EMBODIMENTS

Figure 1:
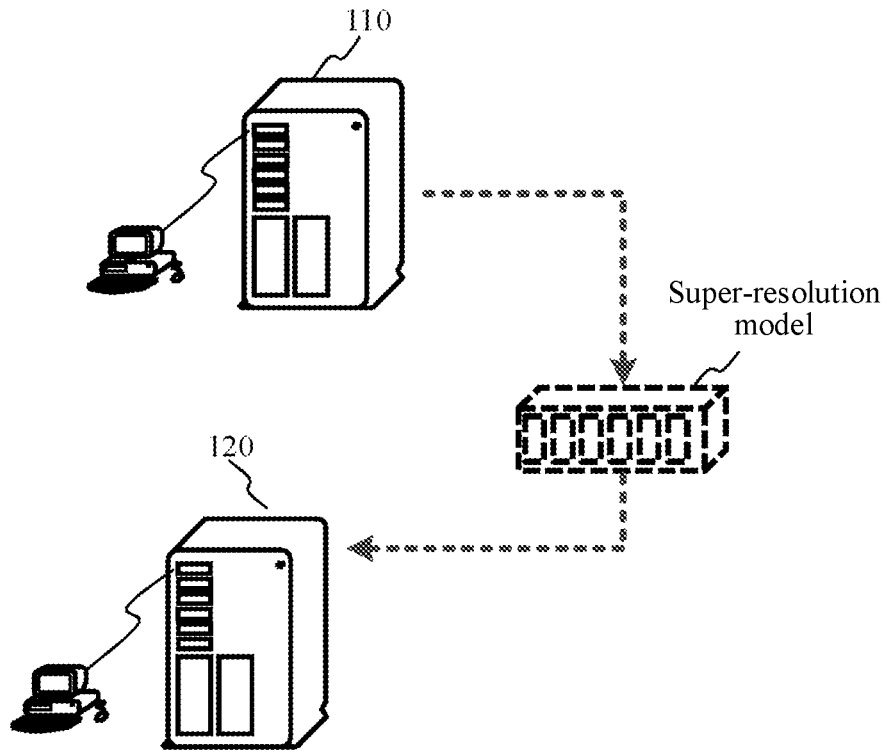
FIG. 1 is a framework diagram of model training and application according to an exemplary embodiment.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

This application provides an audio processing solution. In the solution, an ML model for super-resolution processing can be obtained through training, and a high-frequency component that audio data with a low sampling rate lacks is supplemented as much as possible by using the ML model, so as to implement super-resolution processing of audio data with high accuracy and high efficiency based on artificial intelligence (AI). For ease of understanding, some concepts involved in this application are explained below.

(1) Audio Super-Resolution Technology

In this application, the audio super-resolution technology refers to a technology of increasing an audio signal sampling rate by using an algorithm. Compared with conventional interpolation algorithms, the audio super-resolution technology can better restore a high-frequency signal lost in low-frequency sampling, to obtain audio that sounds richer and fuller.

(2) Artificial Intelligence (AI)

AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning. The solutions provided in the embodiments of this application mainly relate to technologies such as ML/DL in AI.

(3) Machine Learning (ML)

ML is an interdisciplinarity, and relates to a plurality of disciplines such as a probability theory, statistics, an approximation theory, a convex analysis, and an algorithm complexity theory. The ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

(4) Deep Learning (DL)

DL is a new research direction in the field of ML, and is introduced into ML to make it closer to the original target-AI.

DL is an internal law and a representation level of sample data learning. Information obtained in the learning processes helps interpretation of data, such as text, images, and sounds, a lot. The final target of DL is to enable a machine to have analyzing and learning capabilities like humans, and to recognize data such as text, images, and sounds. DL is a complex ML algorithm, and produces effects in terms of speech and image recognition that far exceed those in the related art.

DL makes many achievements in search technologies, data mining, ML, machine translation, natural language processing, multi-media learning, speech, recommendation and personalization technologies, and other related fields.

DL enables a machine to imitate human activities such as viewing and listening and thinking, and resolves many complex mode recognition problems, so that large progresses are made in AI-related technologies.

In current network applications, sampling rates of tracks or audio files of most audio or videos can only reach the lowest lossless standard (that is, 44.1 kHz, which is relatively low from a professional point of view). It is conventionally believed that human ears can only hear sounds of about 20,000 Hz. However, some recent studies show that sounds higher than 20,000 Hz can also be perceived by people. In terms of the market, mobile music players of the top music player manufacturers in the industry can play up to 2.1 MHz audio files, which is about 4.7 times the conventional 44.1 kHz sampling rate. Moreover, in terms of the actual experience, if relatively professional speakers or headphones are used, most users can hear differences between a 96 kHz audio file and a 44.1 kHz audio file, and can obviously feel that the audio file with a 96 kHz sampling rate has better sound quality. As there are an increasing quantity of advanced and professional audio devices on the market (for example, noise reduction headphones, TV echo walls, speakers, and music players), user requirements for audio with a high sampling rate are also increasingly wide. The solutions shown this application can bring users with better sound quality experience by using the audio super-resolution technology.

The solutions in the subsequent embodiments of this application are solutions of training and applying an ML model. FIG. 1 is a framework diagram of model training and application according to an exemplary embodiment. As shown in FIG. 1, in a model training stage, a model training device 110 trains, by using audio samples with different sampling rates in a DL manner, a super-resolution model configured to automatically perform high-quality upsampling processing on audio data. In an application stage, an audio processing device 120 automatically generates, according to the super-resolution model that has been trained and inputted audio data with a low sampling rate, audio data with a high sampling rate for storing a high-frequency component.

The model training device 110 and the audio processing device 120 may be computer devices with a machine learning capability. For example, the computer device may be a fixed computer device such as a personal computer or a server. Alternatively, the computer device may be a mobile terminal with an audio playback function, including, but not limited to, a smartphone, a tablet computer, a wearable device, or an ebook reader and a professional playback device such as earphones, speakers, or a smart TV.

In some embodiments, the model training device 110 and the audio processing device 120 may be the same device. Alternatively, the model training device 110 and the audio processing device 120 may be different devices. Moreover, when the model training device 110 and the audio processing device 120 are different devices, the model training device 110 and the audio processing device 120 may be devices of the same type. For example, the model training device 110 and the audio processing device 120 may both be servers. Alternatively, the model training device 110 and the audio processing device 120 may be devices of different types. For example, the model training device 110 may be a server, and the audio processing device 120 may be a terminal with a music playback function or the like. Specific types of the model training device 110 and the audio processing device 120 are not limited in the embodiments of this application.

For example, using an example in which the model training device 110 is a server, and the audio processing device 120 is a terminal with an audio playback function, development personnel may use the server to construct a training data set and train a super-resolution model, and provide the super-resolution model obtained through training to the terminal. When a user plays audio by using the terminal, the terminal may perform super-resolution processing on audio data actively or under the trigger control of the user.

In another example, when the model training device 110 and the audio processing device 120 are the same device, for example, the model training device 110 and the audio processing device 120 are the same server, development personnel may use the server to construct a training data set and train a super-resolution model. When a user plays audio by using a terminal, the terminal may request an audio super-resolution service from the server. The server may perform super-resolution processing on audio data played by the terminal, and transmit the audio data after the super-resolution processing to the terminal for playback.

Figure 2:
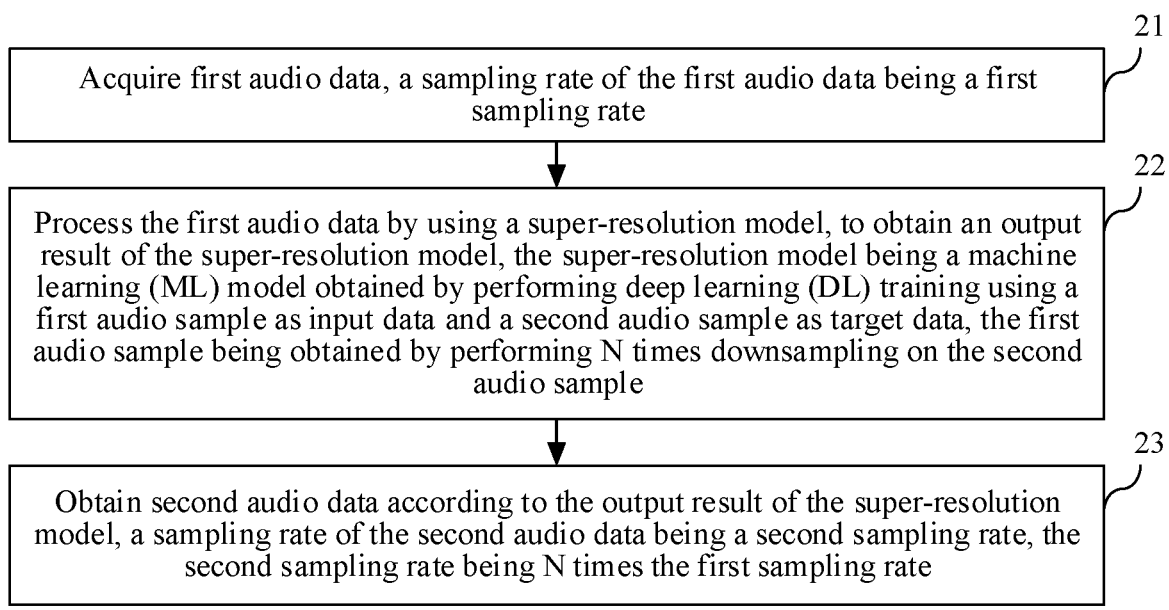
FIG. 2 is a schematic flowchart of audio processing according to an exemplary embodiment.

FIG. 2 is a schematic flowchart of audio processing according to an exemplary embodiment. The audio processing procedure may be performed by a computer device. The computer device may be an audio processing device including a super-resolution model. For example, the audio processing device may be the audio processing device 120 shown in FIG. 1. The audio processing procedure may be as follows:

S21: Acquire first audio data, a sampling rate of the first audio data being a first sampling rate.

The sampling rate of the audio data refers to a quantity of times of sampling a sound signal. A higher sampling rate indicates that a sound is reproduced more real and natural.

Sound is actually an energy wave and also has characteristics such as a frequency and an amplitude. The frequency corresponds to a time axis, and the amplitude corresponds to a level axis. Because a wave is infinitely smooth, a chord line can be regarded as a combination of countless points. Due to a relatively limited storage space, during digital encoding, generally, points on a chord line of a sound signal are sampled. Such a sampling process refers to extracting a frequency value of a specific time point. Obviously, a larger quantity of points extracted within one second indicates richer acquired frequency information. To restore a waveform, at least two points are sampled in one vibration. From the point of view that a highest frequency that the human ear can feel is 20 kHz, to meet auditory requirements of the human ear, at least 40 k times of sampling need to be performed in each second, which is expressed by 40 kHz. The 40 kHz is a sampling rate. A sampling rate of audio carried in a common audio carrier is generally 44.1 kHz.

S22: Process the first audio data by using a super-resolution model, to obtain an output result of the super-resolution model. The super-resolution model is configured to process audio data with a low sampling rate to obtain audio data with a high sampling rate. The super-resolution model is an ML model obtained by performing DL training using a first audio sample as input data and a second audio sample as target data. The first audio sample is obtained by performing N times downsampling on the second audio sample, N being an integer greater than or equal to 2.

S23: Obtain second audio data according to the output result of the super-resolution model, a sampling rate of the second audio data being a second sampling rate, the second sampling rate being N times the first sampling rate.

In this embodiment of this application, the first audio sample is obtained by performing N times downsampling on the second audio sample. Therefore, the second audio sample includes some high-frequency components that the first audio sample lacks. Therefore, the DL model trained by using the first audio sample as an input and the second audio sample as a target can relatively accurately restore a high-frequency component that audio data with a low sampling rate lacks. That is, compared with a solution of obtaining audio data with a sampling rate by simply using an interpolation method, the solution of processing audio data with a low sampling rate by using the super-resolution model to obtain audio data with a high sampling rate can significantly improve an effect of audio processing.

Figure 3:
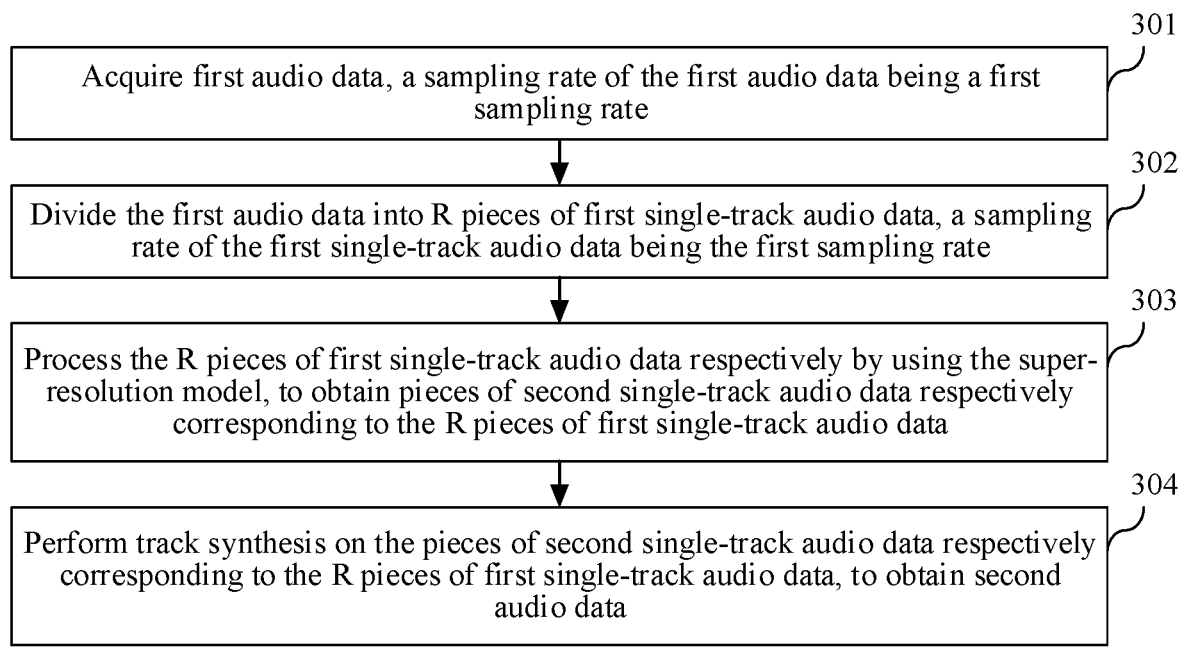
FIG. 3 is a flowchart of an audio processing method according to an exemplary embodiment.

FIG. 3 is a flowchart of an audio processing method according to an exemplary embodiment. The audio processing method may be applied to a computer device, for example, the audio processing device 120 shown in FIG. 1, to perform on super-resolution processing on the first audio data with a low sampling rate, to obtain second audio data with a high sampling rate. As shown in FIG. 3, the audio processing method may include following steps:

Step 301: Acquire first audio data, a sampling rate of the first audio data being a first sampling rate.

The first audio data may be audio data in an independent audio file or audio data carried in a video.

After acquiring the first audio data, the audio processing device may process the first audio data by using a super-resolution model, to obtain an output result of the super-resolution model. The super-resolution model is an ML model obtained by performing DL training using a first audio sample as input data and a second audio sample as target data. The first audio sample is obtained by performing N times downsampling on the second audio sample, N being an integer greater than or equal to 2.

In this this embodiment of this application, the step of performing super-resolution processing on the first audio data may be triggered by a user corresponding to the first audio data or may be actively triggered by the audio processing device.

For example, an audio playback interface of playing the first audio data includes a sound quality adjustment control. When a user performs a trigger operation on the sound quality adjustment control, the audio processing device receives a trigger instruction corresponding to the trigger operation, and the audio processing device may perform, based on the trigger instruction, the subsequent step of performing super-resolution processing on the first audio data.

In another example, after acquiring the first audio data, the audio processing device may detect whether the first sampling rate corresponding to the first audio data satisfies a super-resolution processing condition. For example, when detecting that the first sampling rate is lower than a preset sampling rate threshold, the audio processing device may trigger the subsequent step of performing super-resolution processing on the first audio data.

Step 302: Divide the first audio data into R pieces of first single-track audio data, a sampling rate of the first single-track audio data being the first sampling rate.

In this embodiment of this application, the first audio data may be audio data corresponding to R tracks, R being an integer greater than or equal to 1. When performing super-resolution processing on the first audio data, the audio processing device may divide the first audio data according to tracks. Since audio data corresponding to each track in the first audio data is divided into one piece of single-track audio data, R pieces of first single-track audio data can be obtained from audio data with R tracks, and sampling rates of the pieces of first single-track audio data are all the first sampling rate.

Step 303: Process the R pieces of first single-track audio data respectively by using the super-resolution model, to obtain pieces of second single-track audio data respectively corresponding to the R pieces of first single-track audio data.

A sampling rate of the second single-track audio data is a second sampling rate, the second sampling rate being N times the first sampling rate.

In this embodiment of this application, for each piece of first single-track audio data, the audio processing device performs super-resolution processing on the each piece of first single-track audio data by using the super-resolution model, and after the each piece of first single-track audio data is processed by using the super-resolution model, a corresponding piece of second single-track audio data with a second sampling rate can be obtained.

In a possible implementation, the super-resolution model includes an input layer, a feature extraction layer, an upsampling layer, and an output layer.

The audio processing device processes the R pieces of first single-track audio data respectively by using the super-resolution model, to obtain pieces of second single-track audio data respectively corresponding to the R pieces of first single-track audio data, which may include the following steps:

S303a: Organize an audio data sequence with a length of M/N in target single-track audio data as an input data unit by using the input layer, a size of the input data unit being M/N×1×1, M/N being an integer greater than or equal to 2, and the target single-track audio data being any piece of single-track audio data in the R pieces of first single-track audio data.

The first single-track audio data may be regarded as a one-dimensional audio data sequence. The input layer in the super-resolution model may perform dimension extension on the first single-track audio data, to obtain a three-dimensional input data unit.

M/N is a unit length of an audio data sequence processed by the super-resolution model, that is, the super-resolution model processes the target single-track audio data by using an inputted audio data sequence with a length of M/N as a unit.

S303b: Perform feature extraction on the input data unit by using the feature extraction layer, to obtain a feature data unit with a size of M/N×1×S, S being a quantity of channels of the feature data unit, and S being an integer greater than or equal to 2.

The feature extraction layer may include at least one convolutional layer. Each convolutional layer performs convolution processing on a data unit inputted at an upper layer, and finally, outputs a feature data unit with a size of M/N×1×S.

S303c: Perform N times upsampling on the feature data unit by using the upsampling layer, to obtain an upsampled data unit with a size of M×1×1.

In this embodiment of this application, for each feature data unit obtained by processing an audio data sequence with a length of M/N, the upsampling layer may performs processing on the feature data unit, to obtain an upsampled data unit with a size of M×1×1.

S303d: Output an audio data sequence with a length of M in second single-track audio data corresponding to the target single-track audio data by using the output layer according to the upsampled data unit.

M is a unit length of an audio data sequence outputted by the super-resolution model. In this embodiment of this application, because a result outputted by the upsampling layer is three-dimensional data, the three-dimensional upsampled data unit needs to be converted into a one-dimensional audio data sequence with a length of M by using the output layer.

In some embodiments, the upsampling layer includes a first convolutional layer and a data rearrangement layer. When performing N times upsampling on the feature data unit by using the upsampling layer, to obtain an upsampled data unit with a size of M×1×1, the audio processing device may convert the feature data unit into a to-be-sampled data unit through convolution processing performed by the first convolutional layer, a size of the to-be-sampled data unit being M/N×1×N; and then, exchange data in the first dimension and the second dimension of the to-be-sampled data unit by using the data rearrangement layer, and performing dimensional transformation on the to-be-sampled data unit after the data exchange, to obtain the upsampled data unit.

Figure 4:
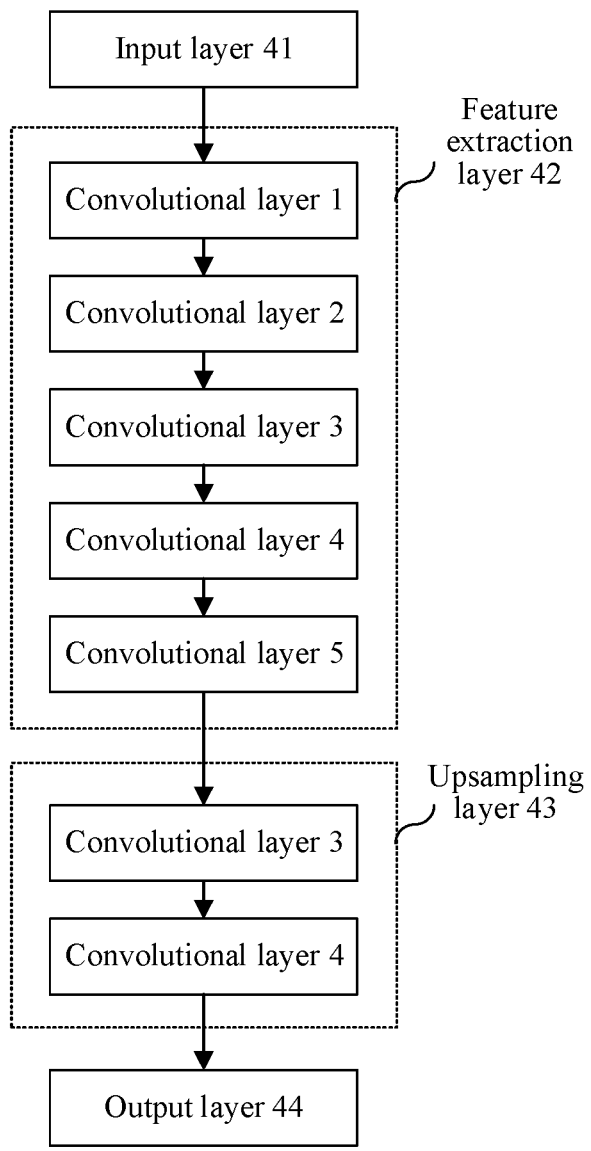
FIG. 4 is a diagram of a model structure of a super-resolution model involved in the embodiment shown in FIG. 3.

For example, FIG. 4 is a diagram of a model structure of a super-resolution model involved in an embodiment of this application. A shown in FIG. 4, the super-resolution model includes an input layer 41, a feature extraction layer 42, an upsampling layer 43, and an output layer 44.

The feature extraction layer 42 includes at least one convolutional layer, that is, convolutional layers 1 to 5 in FIG. 4.

The upsampling layer 43 includes one convolutional layer (equivalent to the first convolutional layer), that is, a convolutional layer 6 in FIG. 4, and a data rearrangement layer.

Related attributes of the input layer, the convolutional layers 1 to 6, and the data rearrangement layer are shown below in Table 1.

TABLE 1

| Layer type | Output size | Quantity of channels | Size of convolution kernels | Stride | Padding | Activation function |
|---|---|---|---|---|---|---|
| Input | M/N × 1 × 1 | 1 | — | — | — | — |
| Convolutional layer 1 | M/N × 1 × 32 | 32 | (3, 3) | (1, 1) | Same | pReLU |
| Convolutional layer 2 | M/N × 1 × 64 | 64 | (3, 3) | (1, 1) | Same | pReLU |
| Convolutional layer 3 | M/N × 1 × 64 | 64 | (3, 3) | (1, 1) | Same | pReLU |
| Convolutional layer 4 | M/N × 1 × 64 | 64 | (3, 3) | (1, 1) | Same | pReLU |
| Convolutional layer 5 | M/N × 1 × 64 | 64 | (3, 3) | (1, 1) | Same | pReLU |
| Convolutional layer 6 | M/N × 1 × N | N | (3, 3) | (1, 1) | Same | pReLU |
| Data rearrangement layer | M × 1 × 1 | 1 | — | — | — | pReLU |

In some embodiments, before processing the first audio data by using the super-resolution model, to obtain the output result of the super-resolution model, the audio processing device may further acquire the super-resolution model corresponding to the first sampling rate and the second sampling rate.

A sampling rate of the first audio sample is the first sampling rate, and a sampling rate of the second audio sample is the second sampling rate.

In this embodiment of this application, the super-resolution model used by the audio processing device when processing the first audio data to obtain the second audio data may be a model directly corresponding to sampling rate values of the first sampling rate and the second sampling rate. That is, sampling rates of training data used for training the super-resolution model are also the first sampling rate and the second sampling rate.

For example, assuming that the first sampling rate of the first audio data is 44.1 kHz, and the sampling rate of the obtained second audio sample is 88.2 kHz, correspondingly, when acquiring the super-resolution model, the audio processing device may select a super-resolution model obtained through training by using the 44.1 kHz first audio sample and 88.2 kHz second audio sample.

In some embodiments, before the super-resolution processing module processes the first audio data by using the super-resolution model, to obtain the output result of the super-resolution model, the audio processing device may further acquire the super-resolution model corresponding to a super-resolution multiple, the super-resolution multiple being a multiple N of the second sampling rate relative to the first sampling rate.

A multiple relationship between the first sampling rate and the second audio sampling rate being equal to a multiple relationship between a sampling rate of the first audio sample and a sampling rate of the second audio sample.

In this embodiment of this application, the super-resolution model used by the audio processing device when processing the first audio data to obtain the second audio data may be a model corresponding to a multiple relationship between the first sampling rate and the second sampling rate. That is, a multiple between sampling rates of training data used for training the super-resolution model needs to be the same as a multiple between the first sampling rate and the second sampling rate, and the sampling rates of the training data used for training the super-resolution model do not need to be the same as the first sampling rate and the second sampling rate.

For example, assuming that the first sampling rate of the first audio data is 44.1 kHz, and the sampling rate of the obtained second audio sample is 88.2 kHz, correspondingly, when acquiring the super-resolution model, the audio processing device may select a model obtained through training by using a first audio sample and a second audio sample obtained by doubling the resolution. For example, samples used for training the model may be a 44.1 kHz first audio sample and an 88.2 kHz second audio sample or a 22.05 kHz first audio sample and a 44.1 kHz second audio sample.

Step 304: Perform track synthesis on the pieces of second single-track audio data respectively corresponding to the R pieces of first single-track audio data, to obtain the second audio data.

In this embodiment of this application, the audio processing device obtains pieces of second single-track audio data respectively corresponding to the pieces of first single-track audio data and may synthesize the pieces of second single-track audio data according to tracks of the first single-track audio data respectively corresponding to the pieces of second single-track audio data, to obtain the second audio data.

When the audio processing device performs processing on the pieces of first single-track audio data, to improve a processing speed, the audio processing device may process the pieces of first single-track audio data in parallel. That is, the audio processing device separately processes each piece of first single-track audio data by using a super-resolution model, and processes the pieces of first single-track audio data in parallel.

Figure 5:
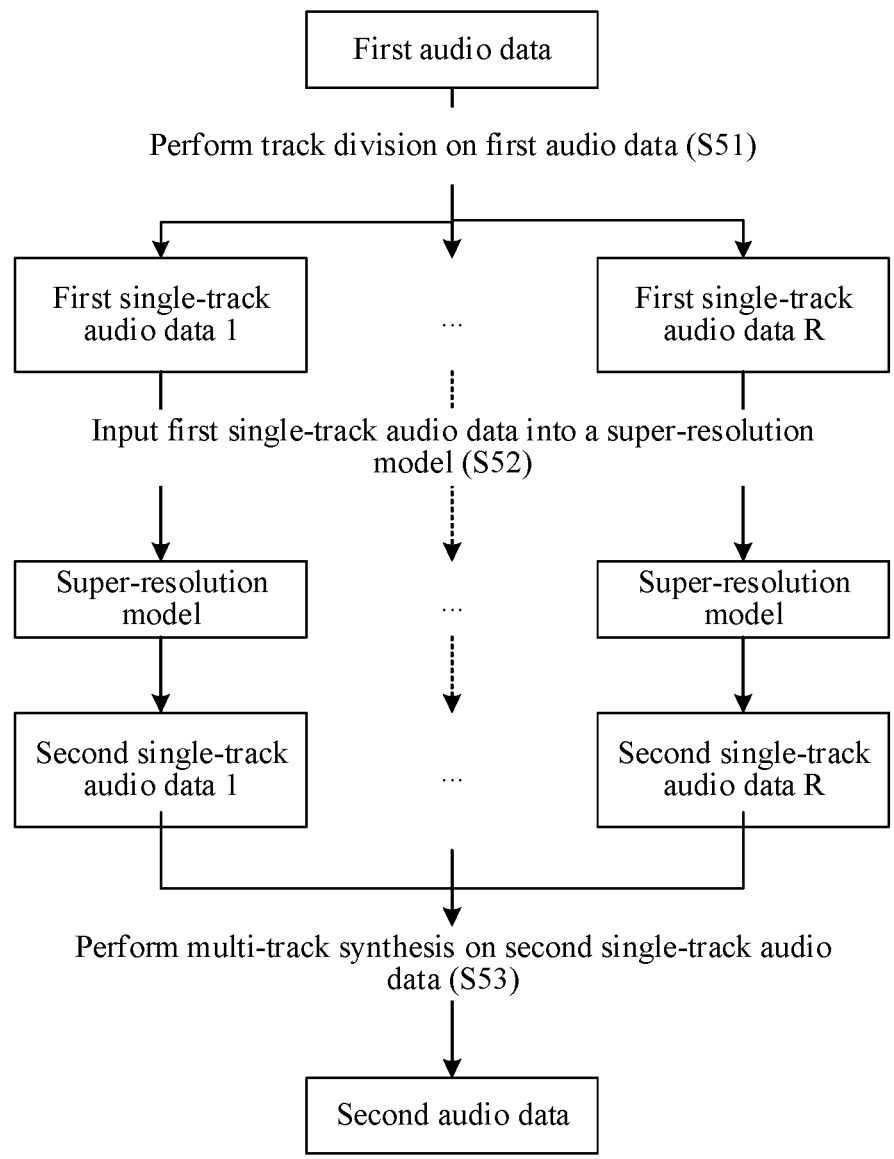
FIG. 5 is a framework diagram of an audio processing procedure involved in the embodiment shown in FIG. 3.

For example, FIG. 5 is a framework diagram of an audio processing procedure involved in an embodiment of this application. As shown in FIG. 5, for first audio data with a plurality of tracks, the audio processing device performs track division on the first audio data (S51), to obtain R pieces of first single-track audio data, that is, first single-track audio data 1 to first single-track audio data R in FIG. 5. The audio processing device inputs the R pieces of first single-track audio data into one of R super-resolution models respectively (S52), to obtain pieces of second single-track audio data correspondingly outputted by each super-resolution model, that is, second single-track audio data 1 to second single-track audio data R in FIG. 5. The audio processing device performs multi-track synthesis on the second single-track audio data 1 to second single-track audio data R (S53), to obtain second audio data with a plurality of tracks after the super-resolution processing.

The method provided in this embodiment of this application can significantly reduce a volume of data processed by an audio super-resolution model, thereby improving a processing of the model. In an actual test, a GPU of which a model is m40 is used. A model using the foregoing parameters can exceed a real-time speed and improve 22.05 kHz audio to a sampling rate of 44.1 kHz (about two times the real-time speed), which means that theoretically, 44.1 kHz audio can be improved to 88.2 kHz almost in real time. That is, when the solution shown in this application is applied to an audio playback terminal, the audio playback terminal can perform, in a process of playing audio of which an original sampling rate is only 44.1 kHz, real-time super-resolution processing on the audio to obtain 88.2 kHz high-quality audio without performing pre-processing.

In conclusion, in the solution shown in this embodiment of this application, the audio processing device acquires first audio data of which a sampling rate is a first sampling rate, the first audio data is processed by using the super-resolution model, and second audio data is obtained according to an output result of the super-resolution model, a sampling rate of the second audio data being a second sampling rate, the second sampling rate being N times the first sampling rate. Because the super-resolution model is an ML model obtained by performing DL training using a first audio sample as input data and a second audio sample as target data, and the first audio sample is obtained by performing N times downsampling on the second audio sample, the model can relatively accurately restore a high-frequency component that audio data with a low sampling rate lacks. That is, the solution of processing audio data with a low sampling rate by using the super-resolution model to obtain audio data with a high sampling rate can significantly improve an effect of audio processing.

Figure 6:
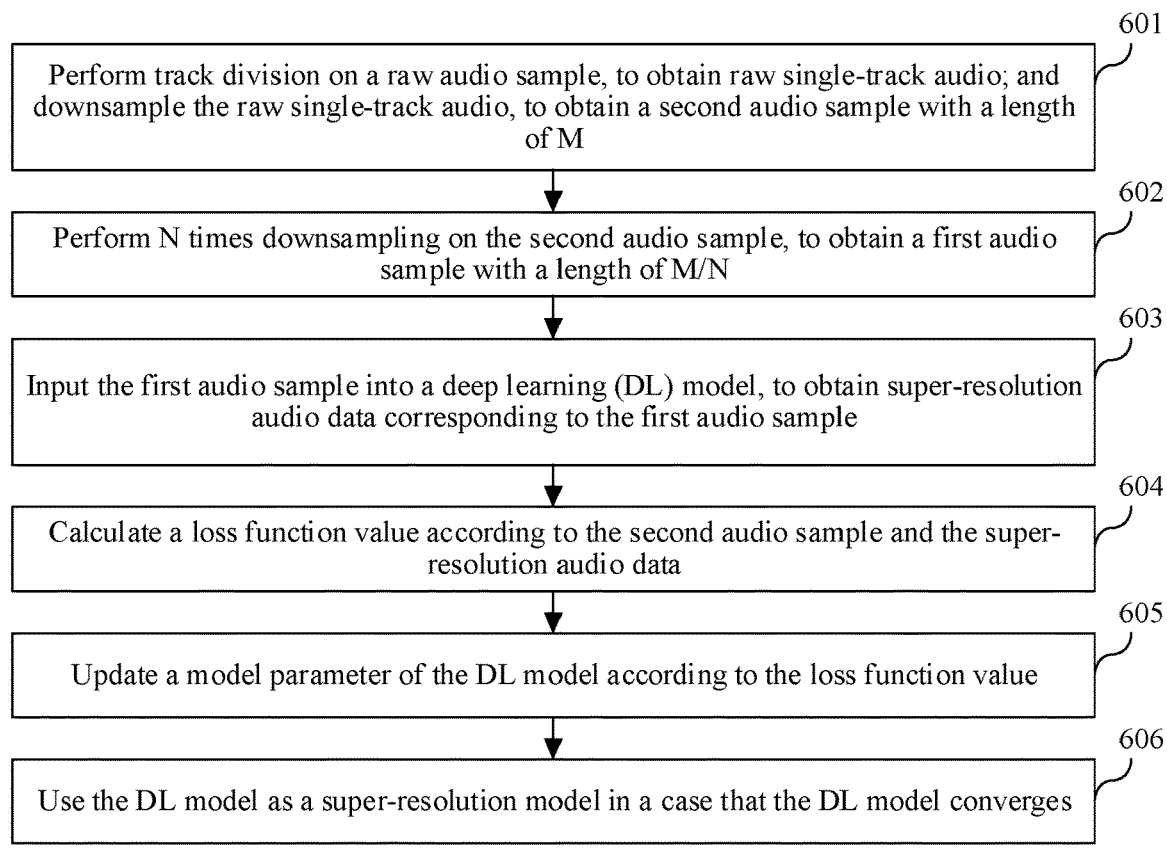
FIG. 6 is a flowchart of a model training method according to an exemplary embodiment.

The super-resolution model involved in the embodiment shown in FIG. 2 or FIG. 3 may be obtained through training or pre-training by the model training device. FIG. 6 is a flowchart of a model training method according to an exemplary embodiment. The method may be applied to a computer device, for example, the model training device 110 shown in FIG. 1, to obtain, through training, the super-resolution model involved in the embodiment shown in FIG. 2 or FIG. 3. As shown in FIG. 6, the model training method may include following steps:

Step 601: Perform track division on a raw audio sample, to obtain raw single-track audio; and downsample the raw single-track audio, to obtain a second audio sample with a length of M.

A sampling rate of the second audio sample is a second sampling rate.

When the raw single-track audio sample is downsampled, a multiple of the downsampling may be determined a sampling rate of the to-be-obtained second audio sample and a sampling rate of the raw single-track audio sample.

Step 602: Perform N times downsampling on the second audio sample, to obtain a first audio sample with a length of M/N.

A sampling rate of the first audio sample is a first sampling rate.

The first audio sample and the second audio sample are respectively single-track audio data.

In this embodiment of this application, when performing N times downsampling on the second audio sample, to obtain the first audio sample with a length of M/N, the model training device may perform N times downsampling on the second audio sample by using a specified downsampling algorithm, to obtain the first audio sample with a length of M/N, the specified downsampling algorithm including a downsampling algorithm based on mean filtering, a downsampling algorithm based on one-dimensional linear interpolation, or a downsampling algorithm based on Fourier interpolation. The specified downsampling algorithm may alternatively be another type of downsampling algorithm, which is not limited in the embodiments of this application.

Using a downsampling algorithm based on mean filtering as an example, if a super-resolution multiple is denoted as N, and a length of the second audio sample is M (M is an integer multiple of N), a one-dimensional linear convolution kernel with a length of N is used to perform convolution on the second audio sample according to a stride of N, where no padding is performed in the convolution operation, so that a corresponding first audio sample can be obtained.

M is a unit length of an audio data sequence outputted by the to-be-trained super-resolution model. That is, the super-resolution model obtained through training in this embodiment of this application outputs an audio data sequence after super-resolution processing with M as a unit length. A value of M may be preset by development personnel. For example, M may be set to 3, 4, 5, or 6 times N, or the like, which is not limited in the embodiments of this application.

Correspondingly, in step 601, the model training device may further downsample the raw single-track audio sample according to the same specified downsampling algorithm, to obtain the second audio sample with a length of M.

In this embodiment of this application, a raw audio sample with a high sampling rate may be used to generate a first audio sample and a second audio sample used for training. For example, high-quality audio with a sampling rate of 192 kHz may be used as a raw audio sample, to generate a training set of the super-resolution model.

Figure 7:
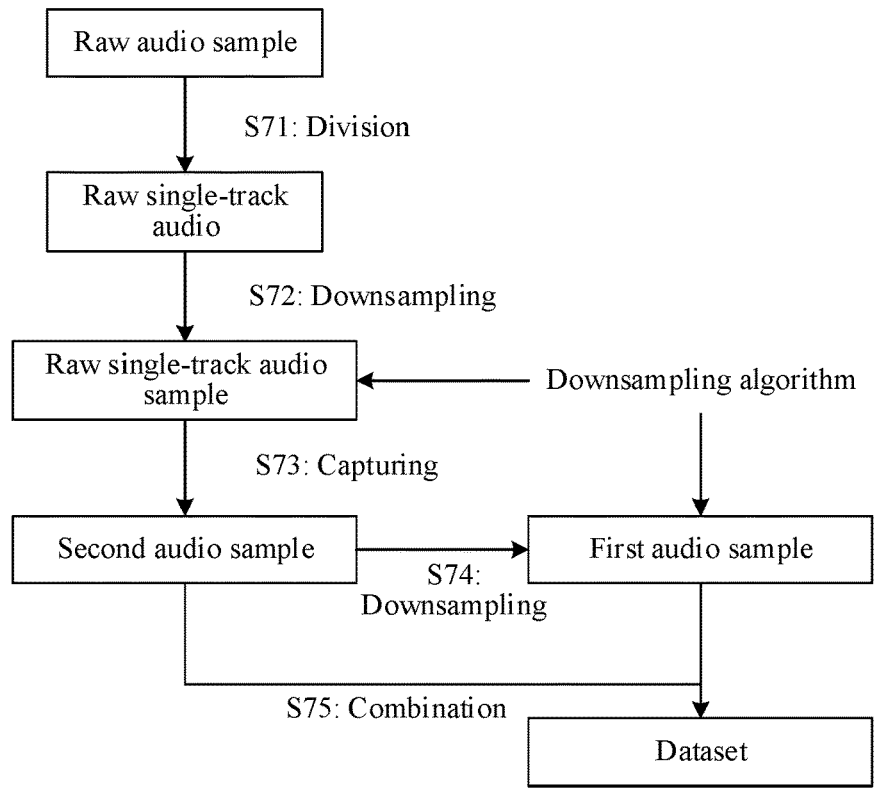
FIG. 7 is a flowchart of sample acquisition involved in the embodiment shown in FIG. 6.

FIG. 7 is a flowchart of sample acquisition involved in an embodiment of this application. As shown in FIG. 7, a process of generating a training set by using a raw audio sample may be as follows:

S71: A model training device divides a raw audio sample into pieces of raw single-track audio of single tracks.

S72: The model training device reduces a sampling rate of the raw single-track audio according to a required downsampling multiple by using a downsampling algorithm, to obtain a raw single-track audio sample.

The downsampling multiple may be set according to a sampling rate of the second audio sample. For models with different super-resolution multiples, downsampling multiples may be set respectively. For example, the downsampling multiple may be set to 0.1 to 1, where 1 indicates that the sampling rate is not reduced.

S73. Capture a second audio sample from the raw single-track audio sample.

For example, a super-resolution multiple is denoted as N, N being an integer, a length of the second audio sample is M (where M needs to be an integer multiple of N), and a stride is H. That is, in the raw single-track audio sample, starting from the first sampling point, a starting position of a clip is selected every H sampling points, and then, starting from the starting position, an audio clip with a length of M is captured. The final part of audio from which an audio clip with a length of M cannot be captured can be discarded.

S74: Reduce the sampling rate of the second audio sample by using the downsampling algorithm, to obtain a first audio sample with a length of M/N.

S75: Combine first audio samples and second audio samples pairwise, all data pairs forming a data set used for training the super-resolution model.

Step 603: Input the first audio sample into a DL model, to obtain super-resolution audio data corresponding to the first audio sample, a sampling rate of the super-resolution audio data being N times that of the first audio sample, and a model structure of the DL model being the same as a model structure of the super-resolution model.

In this step, a process of processing the first audio sample by using a DL model is similar to the process of processing the first single-track audio data by using the super-resolution model in the embodiment shown in FIG. 3, and details are not described herein again.

Step 604: Calculate a loss function value according to the second audio sample and the super-resolution audio data.

In possible implementation, the model training device may calculate a least square error between the second audio sample and the super-resolution audio data, to obtain the loss function value.

In addition to the least square error, the loss function may also be calculated in another manner. For example, the model training device may calculate a least square error between the second audio sample and the super-resolution audio data, to obtain the loss function value. The method for calculating the loss function value is not limited in the embodiments of this application.

Step 605: Update a model parameter of the DL model according to the loss function value.

In this embodiment of this application, the model training device may update the model parameter of the DL model according to the loss function value by using a specified parameter optimization algorithm, the specified parameter optimization algorithm including a quasi-Newton algorithm or gradient descent algorithm. The specified parameter optimization algorithm may alternatively be another algorithm, which is not limited in the embodiments of this application.

Step 606: Use the DL model as the super-resolution model when the DL model converges.

Figure 8:
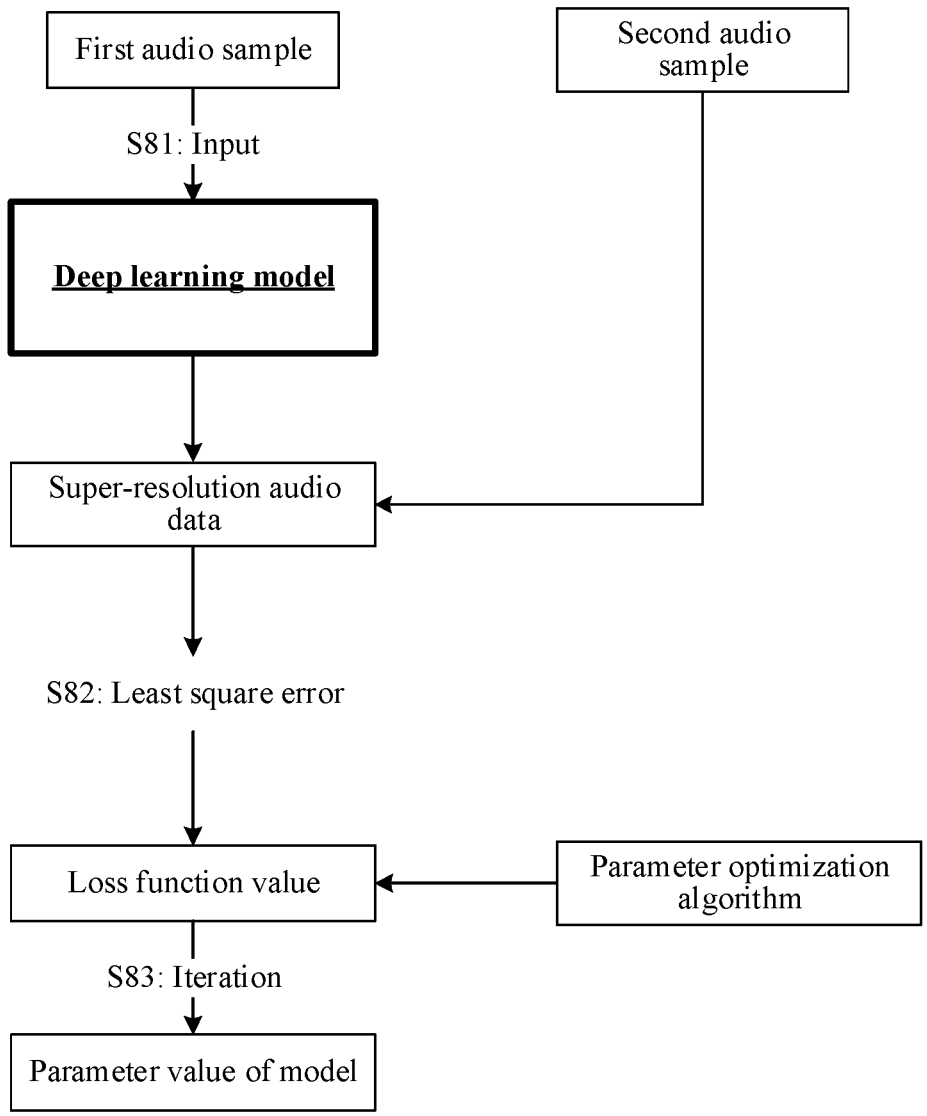
FIG. 8 is a schematic flowchart of model training involved in the embodiment shown in FIG. 6.

In the method shown in this embodiment of this application, a loss function value (loss) may be defined, to reduce a loss by using a value of an optimization model parameter of a parameter optimization algorithm, to finally obtain the trained super-resolution model. An example in which the loss function value is the least square error is used. FIG. 8 is a schematic flowchart of model training involved in an embodiment of this application. As shown in FIG. 8, a procedure in which the model training device trains the super-resolution model may include following steps:

S81: The model training device inputs a first audio sample into a DL model, to output and obtain super-resolution audio data.

A model structure of the DL model may be the same as the model structure involved in the embodiment shown in FIG. 3.

S82: The model training device calculates a least square error of all pieces of super-resolution audio data and a second audio sample, to obtain a to-be-optimized loss function value.

S83: The model training device iterates a parameter value of the DL model by using a parameter optimization algorithm (for example, using a quasi-Newton algorithm), to minimize a loss function value.

Iterations are sufficiently performed until a quantity of iterations is greater than a first given threshold (for example, 200,000), or an obtained average square error is less than a second given threshold (for example, 0.03), so that the model training device can acquire a model parameter of the DL model as a model parameter of the super-resolution model used for subsequent audio processing. Specific values of the first given threshold and the second given threshold may be set respectively by a person skilled in the art according to an actual situation, and are not limited in the embodiments of this application.

In conclusion, in the solution shown in this embodiment of this application, because the super-resolution model is an ML model obtained by performing DL training using a first audio sample as input data and a second audio sample as target data, and the first audio sample is obtained by performing N times downsampling on the second audio sample, the model can relatively accurately restore a high-frequency component that audio data with a low sampling rate lacks. That is, the solution of processing audio data with a low sampling rate by using the super-resolution model to obtain audio data with a high sampling rate can significantly improve an effect of audio processing.

Figure 9:
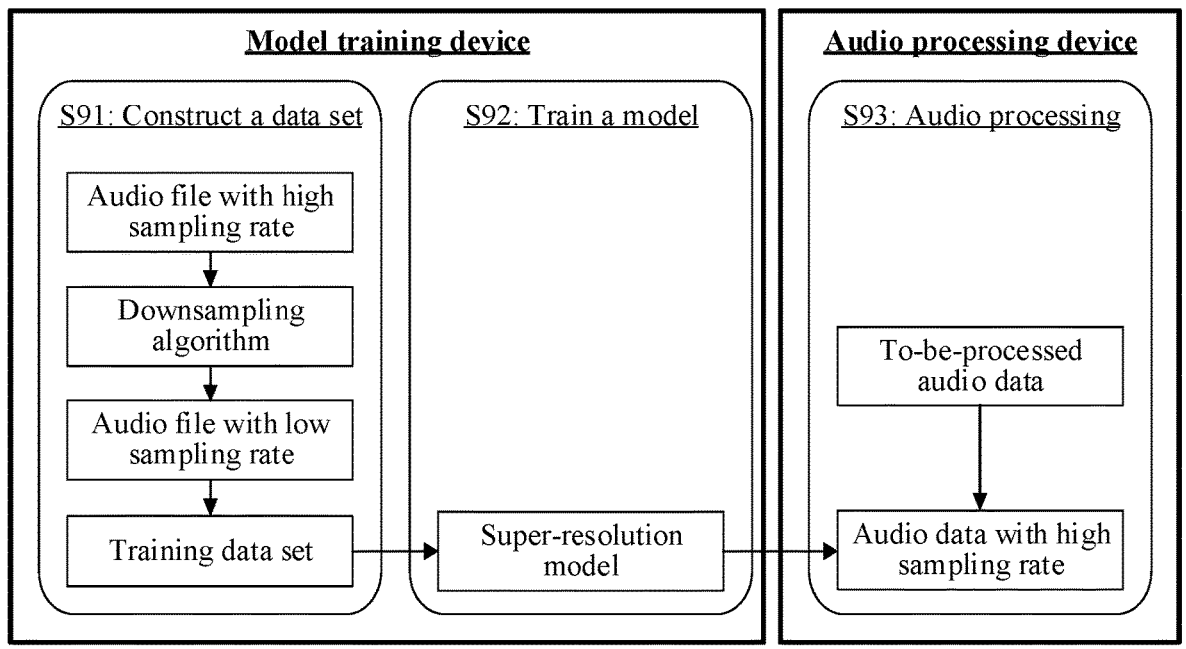
FIG. 9 is a framework diagram of an audio processing procedure according to an exemplary embodiment.

FIG. 9 is a framework diagram of an audio processing procedure according to an exemplary embodiment. As shown in FIG. 9, the solution shown in this application mainly includes three respective parts:

S91. Construct a data set for training an audio super-resolution model.

In the part of S91, an audio file with a high sampling rate may be downsampled by using a downsampling algorithm, to obtain an audio file with a low sampling rate, so as to construct a training data set. For this process, reference may be made to descriptions of step 601 and step 602 in the embodiment shown in FIG. 6, and details are not described herein again.

S92: Train the audio super-resolution model.

In the part of S92, DL training may be performed by using the data set constructed in the part of S91, to obtain a super-resolution model. For this process, reference may be made to descriptions of step 603 to step 606 in the embodiment shown in FIG. 6, and details are not described herein again.

S93: Perform audio processing by using the trained audio super-resolution model.

In the part of S93, to-be-processed audio data may be inputted to the super-resolution model, to obtain a higher sampling rate according to an output result of the super-resolution model, and effectively restore audio data of a high-frequency component. For this step, reference may be made to the descriptions in the embodiment shown in FIG. 2 or FIG. 3, and details are not described herein again.

Figure 10:
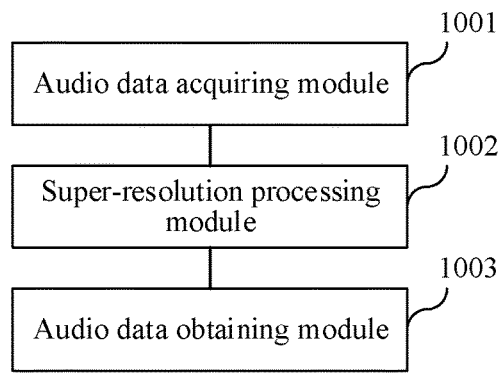
FIG. 10 is a block diagram of an audio processing apparatus according to an exemplary embodiment of this application.

FIG. 10 is a block diagram of an audio processing apparatus according to an exemplary embodiment of this application. The audio processing apparatus may be implemented as all or a part of a computer device in a form of hardware or a combination of software and hardware, to implement all or some of the steps in the embodiment shown in FIG. 2, FIG. 3, or FIG. 6. For example, the computer device may be the audio processing device 120 shown in FIG. 1. Alternatively, the computer device may be a combination of the audio processing device 120 and the model training device 110 shown in FIG. 1. As shown in FIG. 10, the audio processing apparatus includes:

an audio data acquiring module 1001, configured to acquire first audio data, a sampling rate of the first audio data being a first sampling rate;

a super-resolution processing module 1002, configured to process the first audio data by using a super-resolution model, to obtain an output result of the super-resolution model, the super-resolution model being an ML model obtained by performing DL training using a first audio sample as input data and a second audio sample as target data, the first audio sample being obtained by performing N times downsampling on the second audio sample, N being an integer greater than or equal to 2; and an audio data obtaining module 1003, configured to obtain second audio data according to the output result of the super-resolution model, a sampling rate of the second audio data being a second sampling rate, the second sampling rate being N times the first sampling rate.

As used herein, the term module means hardware or a combination of hardware and software configured to perform, execute, or carry out one or more functions. For example, a module can be a circuit, such as an analog circuit, a digital circuit, an integrated circuit (IC), a processor executing instructions stored in a memory to execute the one or more functions, a memory or at least a part of the memory storing instructions executable by a processor to carry out the one or more functions, or any of various combinations thereof.

In some embodiments, the first audio data is audio data corresponding to R tracks, R being an integer greater than or equal to 1.

The super-resolution processing module 1002 includes:

a track division sub-module, configured to divide the first audio data into R pieces of first single-track audio data, a sampling rate of the first single-track audio data being the first sampling rate; and a model processing sub-module, configured to process the R pieces of first single-track audio data respectively by using the super-resolution model, to obtain pieces of second single-track audio data respectively corresponding to the R pieces of first single-track audio data, a sampling rate of the second single-track audio data being the second sampling rate.

The audio data obtaining module 1003 is configured to perform track synthesis on the pieces of second single-track audio data respectively corresponding to the R pieces of first single-track audio data, to obtain the second audio data.

In some embodiments, the super-resolution model includes an input layer, a feature extraction layer, an upsampling layer, and an output layer.

The model processing sub-module is configured to:

organize an audio data sequence with a length of M/N in target single-track audio data as an input data unit by using the input layer, a size of the input data unit being M/N×1×1, M/N being an integer greater than or equal to 2, and the target single-track audio data being any piece of single-track audio data in the R pieces of first single-track audio data;

perform feature extraction on the input data unit by using the feature extraction layer, to obtain a feature data unit with a size of M/N×1×S, S being a quantity of channels of the feature data unit, and S being an integer greater than or equal to 2;

perform N times upsampling on the feature data unit by using the upsampling layer, to obtain an upsampled data unit with a size of M×1×1; and output an audio data sequence with a length of M in second single-track audio data corresponding to the target single-track audio data by using the output layer according to the upsampled data unit.

In some embodiments, the upsampling layer includes a first convolutional layer and a data rearrangement layer.

When performing N times upsampling on the feature data unit by using the upsampling layer, to obtain an upsampled data unit with a size of M×1×1, the model processing sub-module is configured to:

convert the feature data unit into a to-be-sampled data unit through convolution processing performed by the first convolutional layer, a size of the to-be-sampled data unit being M/N×1×N; and exchange data in the first dimension and the second dimension of the to-be-sampled data unit by using the data rearrangement layer, and performing dimensional transformation on the to-be-sampled data unit after the data exchange, to obtain the upsampled data unit.

In some embodiments, the apparatus further includes:

a first model acquiring module, configured to acquire the super-resolution model corresponding to the first sampling rate and the second sampling rate before the super-resolution processing module 1002 processes the first audio data by using the super-resolution model, to obtain the output result of the super-resolution model.

A sampling rate of the first audio sample is the first sampling rate, and a sampling rate of the second audio sample is the second sampling rate.

In some embodiments, the apparatus further includes:

a second model acquiring module, configured to acquire the super-resolution model corresponding to a super-resolution multiple before the super-resolution processing module 1002 processes the first audio data by using the super-resolution model, to obtain the output result of the super-resolution model, the super-resolution multiple being a multiple N of the second sampling rate relative to the first sampling rate.

A multiple relationship between the first sampling rate and the second audio sampling rate being equal to a multiple relationship between a sampling rate of the first audio sample and a sampling rate of the second audio sample.

In some embodiments, the first audio sample and the second audio sample are respectively single-track audio data.

The apparatus further includes:

an input module, configured to input the first audio sample into the DL model, to obtain super-resolution audio data corresponding to the first audio sample before the super-resolution processing module 1002 processes the first audio data by using the super-resolution model, to obtain the output result of the super-resolution model, a sampling rate of the super-resolution audio data being N times that of the first audio sample, and a model structure of the DL model being the same as a model structure of the super-resolution model;

a loss calculation module, configured to calculate a loss function value according to the second audio sample and the super-resolution audio data;

an update module, configured to update a model parameter of the DL model according to the loss function value; and a third model acquiring module, configured to use the DL model as the super-resolution model when the DL model converges.

In some embodiments, the apparatus further includes:

a division module, configured to perform track division on a raw audio sample, to obtain raw single-track audio, before the input module inputs the first audio sample into the DL model, to obtain super-resolution audio data corresponding to the first audio sample;

a first downsampling module, configured to downsample the raw single-track audio, to obtain the second audio sample with a length of M, M being a unit length of an audio data sequence outputted by the super-resolution model, and M/N being an integer greater than or equal to 2; and a second downsampling module, configured to perform N times downsampling on the second audio sample, to obtain the first audio sample with a length of M/N.

In some embodiments, the second downsampling module is configured to:

perform N times downsampling on the second audio sample by using a specified downsampling algorithm, to obtain the first audio sample with a length of M/N.

The specified downsampling algorithm includes a downsampling algorithm based on mean filtering, a downsampling algorithm based on one-dimensional linear interpolation, or a downsampling algorithm based on Fourier interpolation.

In some embodiments, the update module is configured to:

update the model parameter of the DL model according to the loss function value by using a specified parameter optimization algorithm.

The specified parameter optimization algorithm includes a quasi-Newton algorithm or gradient descent algorithm.

In some embodiments, the loss calculation module is configured to calculate a least square error between the second audio sample and the super-resolution audio data, to obtain the loss function value.

In conclusion, in the solution shown in this embodiment of this application, because the super-resolution model is an ML model obtained by performing DL training using a first audio sample as input data and a second audio sample as target data, and the first audio sample is obtained by performing N times downsampling on the second audio sample, the model can relatively accurately restore a high-frequency component that audio data with a low sampling rate lacks. That is, the solution of processing audio data with a low sampling rate by using the super-resolution model to obtain audio data with a high sampling rate can significantly improve an effect of audio processing.

Figure 11:
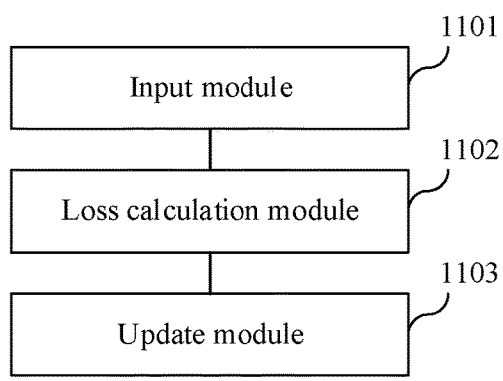
FIG. 11 is a block diagram of a model training apparatus according to an exemplary embodiment of this application.

FIG. 11 is a block diagram of a model training apparatus according to an exemplary embodiment of this application. The model training apparatus may be implemented as all or a part of a computer device in a form of hardware or a combination of software and hardware, to implement all or some of the steps in the embodiment shown in FIG. 6. For example, the computer device may be the model training device 110 shown in FIG. 1. As shown in FIG. 11, the audio processing apparatus includes:

an input module 1101, configured to input the first audio sample into the DL model, to obtain super-resolution audio data corresponding to the first audio sample, a sampling rate of the super-resolution audio data being N times that of the first audio sample, and a model structure of the DL model being the same as a model structure of the super-resolution model;

a loss calculation module 1102, configured to calculate a loss function value according to the second audio sample and the super-resolution audio data;

an update module 1103, configured to update a model parameter of the DL model according to the loss function value; and a third model acquiring module, configured to use the DL model as the super-resolution model when the DL model converges.

In some embodiments, the apparatus further includes:

a division module, configured to perform track division on a raw audio sample, to obtain raw single-track audio, before the input module inputs the first audio sample into the DL model, to obtain super-resolution audio data corresponding to the first audio sample;

a first downsampling module, configured to downsample the raw single-track audio, to obtain the second audio sample with a length of M, M being a unit length of an audio data sequence outputted by the super-resolution model, and M/N being an integer greater than or equal to 2; and a second downsampling module, configured to perform N times downsampling on the second audio sample, to obtain the first audio sample with a length of M/N.

In some embodiments, the second downsampling module is configured to:

perform N times downsampling on the second audio sample by using a specified downsampling algorithm, to obtain the first audio sample with a length of M/N.

The specified downsampling algorithm includes a downsampling algorithm based on mean filtering, a downsampling algorithm based on one-dimensional linear interpolation, or a downsampling algorithm based on Fourier interpolation.

In some embodiments, the update module is configured to:

update the model parameter of the DL model according to the loss function value by using a specified parameter optimization algorithm.

The specified parameter optimization algorithm includes a quasi-Newton algorithm or gradient descent algorithm.

In some embodiments, the loss calculation module is configured to calculate a least square error between the second audio sample and the super-resolution audio data, to obtain the loss function value.

In conclusion, in the solution shown in this embodiment of this application, because the super-resolution model is an ML model obtained by performing DL training using a first audio sample as input data and a second audio sample as target data, and the first audio sample is obtained by performing N times downsampling on the second audio sample, the model can relatively accurately restore a high-frequency component that audio data with a low sampling rate lacks. That is, the solution of processing audio data with a low sampling rate by using the super-resolution model to obtain audio data with a high sampling rate can significantly improve an effect of audio processing.

Figure 12:
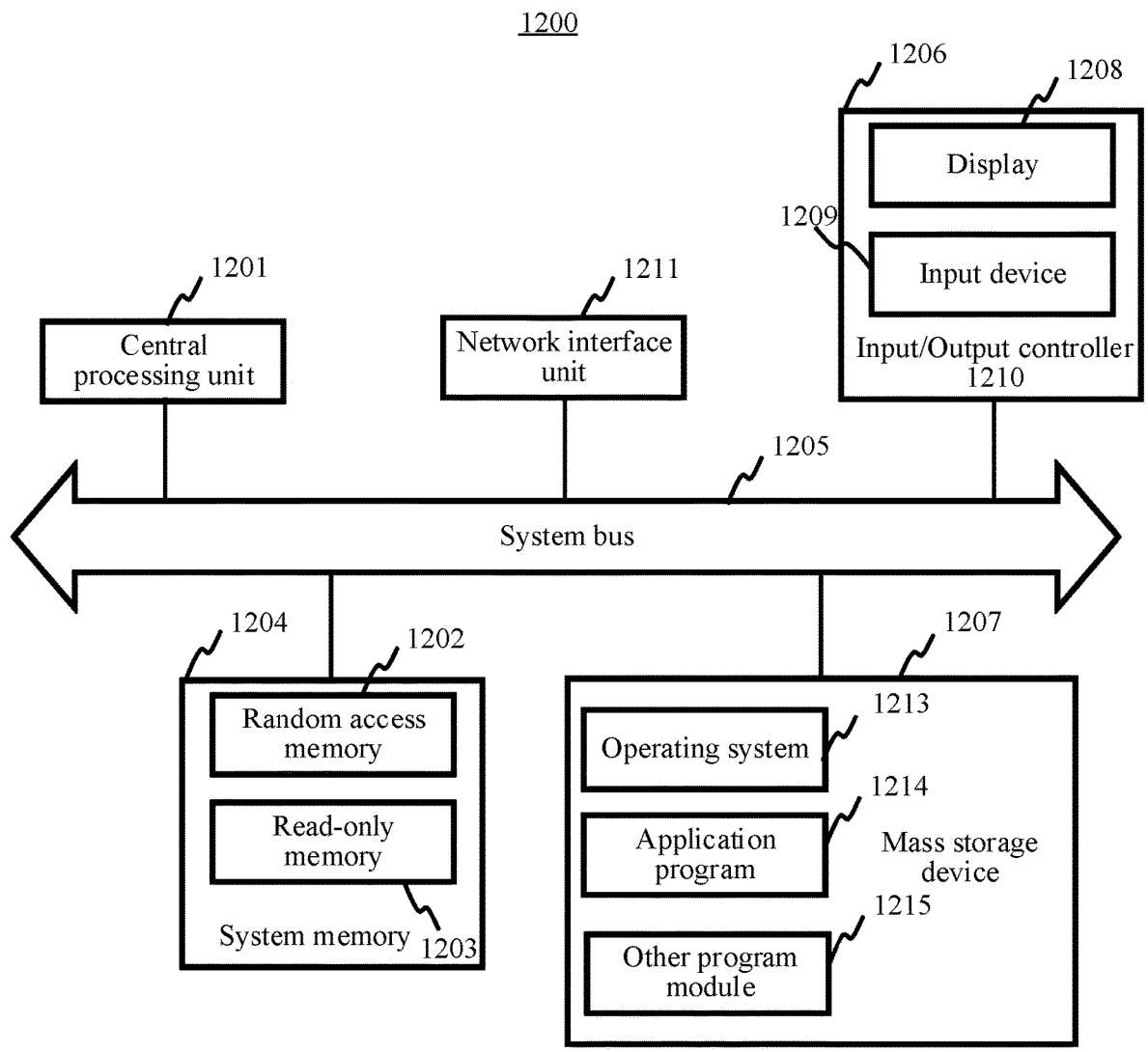
FIG. 12 is a schematic structural diagram of a computer device according to an exemplary embodiment.

FIG. 12 is a schematic structural diagram of a computer device according to an exemplary embodiment. The computer device 1200 includes a central processing unit (CPU) 1201, a system memory 1204 including a random access memory (RAM) 1202 and a read-only memory (ROM) 1203, and a system bus 1205 connecting the system memory 1204 and the CPU 1201. The computer device 1200 further includes a basic input/output (I/O) system 1206 configured to transmit information between components in a computer, and a mass storage device 1207 configured to store an operating system 1213, an application 1214, and another program module 1215.

Additionally, as used herein, the term unit, as used for a component of a computer device or apparatus, means hardware or a combination of hardware and software configured to perform, execute, or carry out one or more functions. For example, a unit can be a circuit, such as an analog circuit, a digital circuit, an integrated circuit (IC), a processor executing instructions stored in a memory to execute the one or more functions, a memory or at least a part of the memory storing instructions executable by a processor to carry out the one or more functions, or any of various combinations thereof.

The basic I/O system 1206 includes a display 1208 configured to display information and an input device 1209 such as a mouse or a keyboard that is used for inputting information by a user. The display 1208 and the input device 1209 are both connected to the CPU 1201 by using an input/output controller 1210 connected to the system bus 1205. The basic I/O system 1206 may further include the input/output controller 1210, to receive and process inputs from a plurality of other devices, such as the keyboard, the mouse, or an electronic stylus. Similarly, the input/output controller 1210 further provides an output to a display screen, a printer, or another type of output device.

The mass storage device 1207 is connected to the CPU 1201 through a mass storage controller (not shown) connected to the system bus 1205. The mass storage device 1207 and an associated computer-readable medium provide non-volatile storage for the computer device 1200. In other words, the mass storage device 1207 may include a computer-readable medium (not shown) such as a hard disk or a CD-ROM drive.

Without loss of generality, the computer-readable media may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 1204 and the mass storage device 1207 may be collectively referred to as a memory.

The computer device 1200 may be connected to the Internet or another network device by using a network interface unit 1211 connected to the system bus 1205.

The memory further includes one or more programs. The one or more programs are stored in the memory. The CPU 1201 executes the one or more programs to implement all or some steps in the method shown in FIG. 2, FIG. 3, or FIG. 6.

In an exemplary embodiment, a non-temporary computer-readable storage medium including an instruction, for example, a memory including a computer program (an instruction), is further provided, and the program (the instruction) may be executed by a processor of a computer device to complete all or some of steps of the methods shown in the embodiments of this application. For example, the non-temporary computer-readable storage medium may be a ROM, a random access memory (RAM), a CD-ROM, a magnetic tape, a floppy disk, an optical data storage device, or the like.

In an exemplary embodiment, a computer program product or a computer program is provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the audio processing method.

A person skilled in the art can easily figure out another implementation solution of this application after considering the specification and practicing the content that is disclosed herein. This application is intended to cover any variations, uses, or adaptive changes of this application. These variations, uses, or adaptive changes follow the general principles of this application and include common general knowledge or common technical means in the art, which are not disclosed in this application. The specification and the embodiments are considered as merely exemplary, and the scope and spirit of this application are pointed out in the following claims.

This application is not limited to the accurate structures that are described above and that are shown in the accompanying drawings, and modifications and changes may be made without departing from the scope of this application. The scope of this application is limited by the appended claims only.

What is claimed is:

1. An audio processing method, performed by a computer device, the method comprising:
    acquiring first audio data, a sampling rate of the first audio data being a first sampling rate;
    processing the first audio data by using a super-resolution model, to obtain an output result of the super-resolution model, the super-resolution model being a machine learning (ML) model obtained by performing deep learning (DL) training using a first audio sample as input data and a second audio sample as target data, the first audio sample being obtained by performing N times downsampling on the second audio sample, N being an integer greater than or equal to 2; and
    obtaining second audio data according to the output result of the super-resolution model, a sampling rate of the second audio data being a second sampling rate, the second sampling rate being N times the first sampling rate.

2. The method according to claim 1, wherein the first audio data is audio data corresponding to R tracks, R being an integer greater than or equal to 1;
    wherein the processing the first audio data comprises:
        dividing the first audio data into R pieces of first single-track audio data, a sampling rate of the first single-track audio data being the first sampling rate; and
        processing the R pieces of first single-track audio data respectively by using the super-resolution model, to obtain pieces of second single-track audio data respectively corresponding to the R pieces of first single-track audio data, a sampling rate of the second single-track audio data being the second sampling rate; and wherein the obtaining second audio data comprises:
  performing track synthesis on the pieces of second single-track audio data respectively corresponding to the R pieces of first single-track audio data, to obtain the second audio data.

3. The method according to claim 2, wherein the super-resolution model comprises an input layer, a feature extraction layer, an upsampling layer, and an output layer; and
  wherein the processing the R pieces of first single-track audio data respectively by using the super-resolution model, to obtain pieces of second single-track audio data respectively corresponding to the R pieces of first single-track audio data comprises:
    organizing an audio data sequence with a length of M/N in target single-track audio data as an input data unit by using the input layer, a size of the input data unit being M/N×1×1, M/N being an integer greater than or equal to 2, and the target single-track audio data being any piece of single-track audio data in the R pieces of first single-track audio data;
    performing feature extraction on the input data unit by using the feature extraction layer, to obtain a feature data unit with a size of M/N×1×S, S being a quantity of channels of the feature data unit, and S being an integer greater than or equal to 2;
    performing N times upsampling on the feature data unit by using the upsampling layer, to obtain an upsampled data unit with a size of M×1×1; and
    outputting an audio data sequence with a length of M in second single-track audio data corresponding to the target single-track audio data by using the output layer according to the upsampled data unit.

4. The method according to claim 3, wherein the upsampling layer comprises a first convolutional layer and a data rearrangement layer; and
  wherein the performing N times upsampling on the feature data unit by using the upsampling layer, to obtain an upsampled data unit with a size of M×1×1 comprises:
    converting the feature data unit into a to-be-sampled data unit through convolution processing performed by the first convolutional layer, a size of the to-be-sampled data unit being M/N×1×N; and
    exchanging data in the first dimension and the second dimension of the to-be-sampled data unit by using the data rearrangement layer, and performing dimensional transformation on the to-be-sampled data unit after the data exchange, to obtain the upsampled data unit.

5. The method according to claim 1, further comprising:
  before the processing the first audio data by using a super-resolution model, to obtain an output result of the super-resolution model:
    acquiring the super-resolution model corresponding to the first sampling rate and the second sampling rate,
    a sampling rate of the first audio sample being the first sampling rate, and a sampling rate of the second audio sample being the second sampling rate.

6. The method according to claim 1, wherein before the processing the first audio data by using a super-resolution model, to obtain an output result of the super-resolution model, the method further comprises:
  acquiring the super-resolution model corresponding to a super-resolution multiple, the super-resolution multiple being a multiple N of the second sampling rate relative to the first sampling rate,
  a multiple relationship between the first sampling rate and the second audio sampling rate being equal to a multiple relationship between a sampling rate of the first audio sample and a sampling rate of the second audio sample.

7. The method according to claim 1, wherein the first audio sample and the second audio sample are respectively single-track audio data; and wherein the method further comprises:
  before the processing the first audio data by using a super-resolution model, to obtain an output result of the super-resolution model:
    inputting the first audio sample into the DL model, to obtain super-resolution audio data corresponding to the first audio sample, a sampling rate of the super-resolution audio data being N times that of the first audio sample, and a model structure of the DL model being the same as a model structure of the super-resolution model;
    calculating a loss function value according to the second audio sample and the super-resolution audio data;
    updating a model parameter of the DL model according to the loss function value; and
    using the DL model as the super-resolution model when the DL model converges.

8. The method according to claim 7, further comprising:
  before the inputting the first audio sample into the DL model, to obtain super-resolution audio data corresponding to the first audio sample:
    performing track division on a raw audio sample, to obtain raw single-track audio;
    downsampling the raw single-track audio, to obtain the second audio sample with a length of M, M being a unit length of an audio data sequence outputted by the super-resolution model, and M/N being an integer greater than or equal to 2; and
    performing N times downsampling on the second audio sample, to obtain the first audio sample with a length of M/N.

9. The method according to claim 8, wherein the performing N times downsampling on the second audio sample, to obtain the first audio sample with a length of M/N comprises:
  performing N times downsampling on the second audio sample by using a specified downsampling algorithm, to obtain the first audio sample with a length of M/N,
  the specified downsampling algorithm comprising a downsampling algorithm based on mean filtering, a downsampling algorithm based on one-dimensional linear interpolation, or a downsampling algorithm based on Fourier interpolation.

10. The method according to claim 7, wherein the updating a model parameter of the DL model according to the loss function value comprises:
  updating the model parameter of the DL model according to the loss function value by using a specified parameter optimization algorithm,
  the specified parameter optimization algorithm comprising a quasi-Newton algorithm or gradient descent algorithm.

11. The method according to claim 7, wherein the calculating comprises:
  calculating a least square error between the second audio sample and the super-resolution audio data, to obtain the loss function value.

12. A computer device comprising:
a memory storing a plurality of instructions; and
a processor configured to execute the plurality of instructions, and upon execution of the plurality of instructions, configured to:
  acquire first audio data, a sampling rate of the first audio data being a first sampling rate;
  process the first audio data by using a super-resolution model, to obtain an output result of the super-resolution model, the super-resolution model being a machine learning (ML) model obtained by performing deep learning (DL) training using a first audio sample as input data and a second audio sample as target data, the first audio sample being obtained by performing N times downsampling on the second audio sample, N being an integer greater than or equal to 2; and
  obtain second audio data according to the output result of the super-resolution model, a sampling rate of the second audio data being a second sampling rate, the second sampling rate being N times the first sampling rate.

13. The computer device according to claim 12, wherein the first audio data is audio data corresponding to R tracks, R being an integer greater than or equal to 1,
wherein the processor, upon execution of the plurality of instructions, is further configured to:
  divide the first audio data into R pieces of single-track audio data, a sampling rate of the first single-track audio data being the first sampling rate;
  process the R pieces of first single-track audio data respectively by using the super-resolution model, to obtain pieces of second single-track audio data respectively corresponding to the R pieces of first single-track audio data, a sampling rate of the second single-track audio data being the second sampling rate; and
  perform track synthesis on the pieces of second single-track audio data respectively corresponding to the R pieces of first single-track audio data, to obtain the second audio data.

14. The computer device according to claim 13, wherein the super-resolution model comprises an input layer, a feature extraction layer, an upsampling layer, and an output layer; and
wherein, in order to process the R pieces of first single-track audio data respectively, the processor, upon execution of the plurality of instructions, is configured to:
  organize an audio data sequence with a length of M/N in target single-track audio data as an input data unit by using the input layer, a size of the input data unit being M/N×1×1, M/N being an integer greater than or equal to 2, and the target single-track audio data being any piece of single-track audio data in the R pieces of first single-track audio data;
  perform feature extraction on the input data unit by using the feature extraction layer, to obtain a feature data unit with a size of M/N×1×S, S being a quantity of channels of the feature data unit, and S being an integer greater than or equal to 2;
  perform N times upsampling on the feature data unit by using the upsampling layer, to obtain an upsampled data unit with a size of M×1×1; and
  output an audio data sequence with a length of M in second single-track audio data corresponding to the target single-track audio data by using the output layer according to the upsampled data unit.

15. The computer device according to claim 12, wherein the processor, upon execution of the plurality of instructions, is further configured to:
  before processing the first audio data:
    acquire the super-resolution model corresponding to the first sampling rate and the second sampling rate, a sampling rate of the first audio sample being the first sampling rate, and a sampling rate of the second audio sample being the second sampling rate.

16. The computer device according to claim 12, wherein the processor, upon execution of the plurality of instructions, is further configured to:
  before processing the first audio data:
    acquire the super-resolution model corresponding to a super-resolution multiple, the super-resolution multiple being a multiple N of the second sampling rate relative to the first sampling rate,
    a multiple relationship between the first sampling rate and the second audio sampling rate being equal to a multiple relationship between a sampling rate of the first audio sample and a sampling rate of the second audio sample.

17. A non-transitory computer readable storage medium storing a plurality of instructions executable by a processor of a computer device, the plurality of instructions, when executed by the processor, cause the processor to:
  acquire first audio data, a sampling rate of the first audio data being a first sampling rate;
  process the first audio data by using a super-resolution model, to obtain an output result of the super-resolution model, the super-resolution model being a machine learning (ML) model obtained by performing deep learning (DL) training using a first audio sample as input data and a second audio sample as target data, the first audio sample being obtained by performing N times downsampling on the second audio sample, N being an integer greater than or equal to 2; and
  obtain second audio data according to the output result of the super-resolution model, a sampling rate of the second audio data being a second sampling rate, the second sampling rate being N times the first sampling rate.

18. The non-transitory computer readable storage medium according to claim 17, wherein the first audio sample and the second audio sample are respectively single-track audio data, and wherein the plurality of instructions, when executed by the processor, further cause the processor to:
  before processing the first audio data by using a super-resolution model:
    input the first audio sample into the DL model, to obtain super-resolution audio data corresponding to the first audio sample, a sampling rate of the super-resolution audio data being N times that of the first audio sample, and a model structure of the DL model being the same as a model structure of the super-resolution model;
    calculate a loss function value according to the second audio sample and the super-resolution audio data;
    update a model parameter of the DL model according to the loss function value; and
    use the DL model as the super-resolution model when the DL model converges.

19. The non-transitory computer readable storage medium according to claim 18, wherein the plurality of instructions, when executed by the processor, further cause the processor to:
- before the input of the first audio sample into the DL model, to obtain super-resolution audio data corresponding to the first audio sample:
  - perform track division on a raw audio sample, to obtain raw single-track audio;
  - downsample the raw single-track audio, to obtain the second audio sample with a length of M, M being a unit length of an audio data sequence outputted by the super-resolution model, and M/N being an integer greater than or equal to 2; and
  - perform N times downsampling on the second audio sample, to obtain the first audio sample with a length of M/N.

20. The non-transitory computer readable storage medium according to claim 18, wherein, in order to update a model parameter of the DL model according to the loss function value, the plurality of instructions, when executed by the processor, cause the processor to:
- update the model parameter of the DL model according to the loss function value by using a specified parameter optimization algorithm,
- the specified parameter optimization algorithm comprising a quasi-Newton algorithm or gradient descent algorithm.

* * * * *